Patented Nov. 24, 1936

2,062,159

UNITED STATES PATENT OFFICE 2,062,159

DISPERSIBLE CARBON BLACK

Alfred A. Brizzolara, New York, N. Y., Edwin L. Duhring, Plainfield, and Archibald M. Erskine, Chatham, N. J., assignors, by mesne assignments, to E. I. du Pont de Nemours and Company, a corporation of Delaware No Drawing. Application May 18, 1934, Serial No. 726,288

1 Claim. (Cl. 134—58)

The present invention relates to carbon black, the particles of which are associated with a water insoluble alkaline earth metal salt of a naphthenic acid.

Ordinary carbon blacks such as gas black, lamp black and special products as known under various trade names, are characterized by extreme fluffiness or large bulk, poor wettability, high apparent oil absorption, etc. Their relatively difficult dispersion properties in vehicles used for printing inks, lacquers and synthetic resin enamels have been a drawback in their use in such pigmenting arts.

The improved dispersible carbon blacks of our invention overcome these drawbacks and they are exceedingly well suited for incorporation into printing inks, lithographic varnishes, lacquers made from natural resins or containing cellulose derivatives, synthetic resins particularly of the Glyptal type, etc.

The method of preparing our novel dispersible carbon blacks consists in its broadest aspect in precipitating an alkaline earth metal naphthenate from an aqueous solution containing a soluble naphthenate in the presence of the carbon black.

This is achieved, for instance, by suspending the carbon black in an aqueous solution of an alkali metal or ammonium naphthenate and adding an alkaline earth metal salt to the suspension. In another modification of this process we can also suspend the carbon black in a solution of an alkaline earth metal salt and then add the soluble naphthenate.

An alkaline earth metal naphthenate is formed by these procedures and this is associated with the carbon black. We do not know exactly how such insoluble naphthenate is associated with the carbon black particles. In order to distinguish our novel dispersible carbon blacks, in which the naphthenate has been precipitated in the presence of the black particles, from mere mechanical mixtures of carbon black particles with pre-formed alkaline earth metal naphthenates we shall, in the following, designate our novel blacks as containing adsorbed alkaline earth metal naphthenates without thereby in any way implying or limiting ourselves to any theoretical explanation of the bond between the black particles and the naphthenate.

The naphthenates useful in our invention are derived from carboxylic acids of naturally occurring partly cyclic paraffin, or mineral oils. They form water soluble alkali metal and ammonium salts. The alkaline earth metal salts which we precipitate upon carbon blacks are their magnesium, calcium, strontium and barium compounds.

The amount of naphthenates which we incorporate into the carbon blacks is generally between 1 and 10% of the black figured on the naphthenic acid corresponding to the alkaline earth metal salt precipitated.

The novel dispersible blacks produced according to our invention have definite characteristics which distinguish them in a very useful manner from ordinary carbon blacks when used in the pigmenting arts or in the pigmenting of plastic compositions such as artificial or synthetic resins or in the compounding of rubber.

Their dry bulk is markedly decreased, i. e. their apparent density is increased: our novel blacks have only about one-fourth of the bulk of ordinary blacks.

Their wettability by non-aqueous vehicles is greatly increased: it requires only about one-half as much time to mix given amounts of our blacks and vehicle as in the case of ordinary blacks.

On the other hand the novel blacks are water repellent but easily dispersible in organic solvents such as mineral thinners, solvents for resins or nitrocellulose, etc.

The apparent oil absorption of the novel blacks is greatly decreased. This has the following effects upon their use for printing or lithographic inks and varnishes.

For the same amount of pigment, the inks made from our blacks have a softer body and greater length than those from an ordinary, untreated black.

While maintaining the same body and length of ink, the pigment concentration can be increased to a very much greater extent in the case of our treated black. For example, as much as 40% of our novel blacks can be incorporated with the vehicle in the mixing operation, which is not possible with ordinary blacks. This results in a greater strength and an improved color for the same consistency of ink, an obvious advantage to the printer. In other words, the improved wettability of our novel blacks enables an increase in pigment concentration with retention of a workable consistency and without the usual bodying trouble accompanying an attempt to increase the pigment concentration with ordinary blacks.

The novel blacks of our invention have in addition improved color properties which are particularly noticeable in the luster of the prints and the high gloss of the enamels prepared from our blacks. This luster and gloss is, furthermore, retained on drying which is of especial value in synthetic resin enamel preparations.

Attempts to produce carbon blacks of similar properties by incorporating insoluble salts of fatty acids into blacks have entirely failed and we believe that the naphthenates have especial properties to which we attribute the decreased bulk and easy wettability of the blacks treated according to our invention.

The following is an example of a detailed preparation of our novel products and it will be understood that our invention is not limited to the specific conditions described nor to the specific materials used in this example:

25 parts by weight of gas black was slurred in 1000 parts of water and heated to the boil. A solution of sodium naphthenate, prepared by treating 2.5 parts of naphthenic acid with 0.32 parts of caustic soda in 50 parts of boiling water was then added to the carbon black suspension. This was then boiled for 15 minutes and diluted to about 2000 parts water.

A solution of 10 parts barium chloride crystals in 100 parts of water was then slowly run into the above suspension, after which it was boiled for one hour. It was then filtered, washed free from excess reagents, dried and ground. The resulting product is a carbon black containing adsorbed barium naphthenate. It is readily dispersible in non-aqueous vehicles and is eminently suited for incorporation into printing inks, lithographic and other varnishes, plastic compositions, synthetic resins, etc., or for compounding rubber.

Instead of the barium naphthenate we can use magnesium, calcium or strontium naphthenates and obtain substantially the same results, or we can use lesser amounts of naphthenates, or we can adsorb the alkaline earth metal naphthenates upon other types of finely divided carbon blacks.

We claim:

Carbon black containing from about 1 to 10% adsorbed naphthenate of one of the metals of the group consisting of magnesium, calcium, barium and strontium, the adsorbed naphthenate improving the color, luster and gloss of the carbon black.

ALFRED A. BRIZZOLARA.
EDWIN L. DUHRING.
ARCHIBALD M. ERSKINE.